United States Patent
Liu (10) Patent No.: US 11,768,907 B2
(45) Date of Patent: Sep. 26, 2023

(54) SEARCH METHOD, SEARCH DEVICE, ELECTRONIC DEVICE AND STORAGE MEDIUM

(71) Applicant: Baidu International Technology (Shenzhen) Co., Ltd., Shenzhen (CN)

(72) Inventor: Junqi Liu, Shenzhen (CN)

(73) Assignee: Baidu International Technology (Shenzhen) Co., Ltd., Beijing (CN)

( * ) Notice: Subject to any disclaimer, the term of this patent is extended or adjusted under 35 U.S.C. 154(b) by 0 days.

(21) Appl. No.: 17/208,446

(22) Filed: Mar. 22, 2021

(65) Prior Publication Data

US 2021/0209187 A1 Jul. 8, 2021

(30) Foreign Application Priority Data

Sep. 25, 2020 (CN) .......................... 202011020714.0

(51) Int. Cl.
*G06F 16/90* (2019.01)
*G06F 16/957* (2019.01)
(Continued)

(52) U.S. Cl.
CPC ...... *G06F 16/9574* (2019.01); *G06F 16/9532* (2019.01); *H04L 67/5681* (2022.05); *H04L 67/5682* (2022.05)

(58) Field of Classification Search
CPC .......................... G06F 16/9574; G06F 16/9532
See application file for complete search history.

(56) References Cited

U.S. PATENT DOCUMENTS 10,572,548 B2 * 2/2020 Burkard .............. G06F 16/9574
2008/0127133 A1 5/2008 Aghara et al.
(Continued)

FOREIGN PATENT DOCUMENTS

CN 103617253 A * 3/2014
CN 107463641 A 12/2017
(Continued)

OTHER PUBLICATIONS

The extended European Search report for European application No. EP21164554 dated Sep. 8, 2021.
(Continued)

*Primary Examiner* — Kristopher Andersen
(74) *Attorney, Agent, or Firm* — Quinn IP Law (57) ABSTRACT

A search method, a search device, an electronic device, and a storage medium are provided, which relate to the field of intelligent search technologies. The method includes: receiving a first keyword inputted by a user; receiving a target resource sent by a server if a degree of association between the first keyword and a target keyword or a target page meets a preset condition, where the target resource is a resource of a search result page corresponding to the target keyword or a resource of the target page; pre-rendering a received target resource in a target container when receiving the target resource returned by the server; outputting, if a first search instruction inputted by the user is detected, the resource in the target container in response to the first search instruction; where the first search instruction is an instruction to search for the target keyword or the target page.

17 Claims, 4 Drawing Sheets

(51) Int. Cl.
　　*G06F 16/9532* (2019.01)
　　*H04L 67/5681* (2022.01)
　　*H04L 67/5682* (2022.01)
　　*H04L 67/50* (2022.01)

(56) References Cited

U.S. PATENT DOCUMENTS

| | | |
|---|---|---|
| 2012/0158884 A1 | 6/2012 | Hatano |
| 2013/0019159 A1 | 1/2013 | Civelli et al. |
| 2013/0191360 A1 | 7/2013 | Burkard et al. |
| 2016/0246888 A1 | 8/2016 | Burkard et al. |
| 2020/0265094 A1* | 8/2020 | Liu ................... G06F 40/247 |

FOREIGN PATENT DOCUMENTS

| | | |
|---|---|---|
| CN | 103617253 B | 1/2018 |
| CN | 106649640 B | 5/2020 |
| CN | 111159592 A | 5/2020 |
| CN | 109918555 B * | 10/2021 ....... G06F 16/90328 |
| JP | 2016224987 A | 12/2016 |
| WO | 2011024949 A1 | 3/2011 |

OTHER PUBLICATIONS

Wenchang Xu, Chun Yu, Songmin Zhao, Jie Liu, Yuanchun Shi, "Facilitating Parallel Web Browsing through Multiple-Page View", 2013, Tsinghua University, Beijing, 100084, China.
Japanese Office Action for Japanese Patent Application No. 2021-048175, dated Feb. 15, 2022.
European Office Action for European Patent Application No. 21 164 554.4, dated Jun. 21, 2022.
Schalkwyk et al., "Your Word is my Command", Google Search by Voice: A Case Study, Jan. 1, 2010, p. 61-90; ISBN: 978-1-4419-5950-8.
Korean Office Action for Korean Application No. 10-2021-0036461, dated Nov. 1, 2022.

* cited by examiner

SEARCH METHOD, SEARCH DEVICE, ELECTRONIC DEVICE AND STORAGE MEDIUM

CROSS-REFERENCE TO RELATED APPLICATION

The present application claims a priority to Chinese patent application No. 202011020714.0 filed in China on Sep. 25, 2020, a disclosure of which is incorporated in its entirety by reference herein.

TECHNICAL FIELD

The present application relates to the field of computer technologies, in particular to the field of search technologies, and specifically to a search method, a search device, an electronic device, and a storage medium.

BACKGROUND

Conventionally, when a user performs a search on the Internet, a search request to a server is usually not initiated until the user inputs a keyword into a search box and initiates a search instruction (e.g., by clicking on a search button or an Enter key). After receiving resources of a search result page returned by the server, the client performs page rendering according to the resources of the search result page returned by the server. With conventional search methods, a search response speed is slow.

SUMMARY

According to a first aspect, the present application provides a search method. The search method includes: receiving a first keyword inputted by a user; receiving a target resource sent by a server in a case that a degree of association between the first keyword and a target keyword or a target page meets a preset condition, where the target resource is a resource of a search result page corresponding to the target keyword or a resource of the target page; pre-rendering a received target resource in a target container when receiving the target resource returned by the server; outputting, in a case that a first search instruction inputted by the user is detected, the resource in the target container in response to the first search instruction, where the first search instruction is an instruction to search for the target keyword or the target page.

According to a second aspect, the present application provides a search device, and the device includes: a first reception module, configured to receive a first keyword inputted by a user; a second reception module, configured to receive a target resource sent by a server in a case that a degree of association between the first keyword and a target keyword or a target page meets a preset condition, where the target resource is a resource of a search result page corresponding to the target keyword or a resource of the target page; a first pre-rendering module, configured to pre-render a received target resource in a target container when receiving the target resource returned by the server; a first output module, configured to output, in a case that a first search instruction inputted by the user is detected, the resource in the target container in response to the first search instruction, where the first search instruction is an instruction to search for the target keyword or the target page.

According to a third aspect, the present application provides an electronic device, and the device includes: at least one processor; and a storage communicatively connected to the at least one processor, where the storage stores therein an instruction configured to be executed by the at least one processor, and the at least one processor is configured to execute the instruction, to implement any method in the first aspect.

According to a fourth aspect, a non-transitory computer-readable storage medium storing therein a computer instruction is provided, where the computer instruction is used for causing a computer to implement any method in the first aspect.

It is understood, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The drawings are used to facilitate a better understanding of the solution and constitute no limitation of the present application.

DETAILED DESCRIPTION

In the following description, numerous details of the embodiments of the present application, which should be deemed merely as exemplary, are set forth with reference to accompanying drawings to provide a thorough understanding of the embodiments of the present application. Therefore, those skilled in the art will appreciate that modifications or replacements may be made in the described embodiments without departing from the scope and spirit of the present application. Further, for clarity and conciseness, descriptions of known functions and structures are omitted in the following description.

First Embodiment

Figure 1:
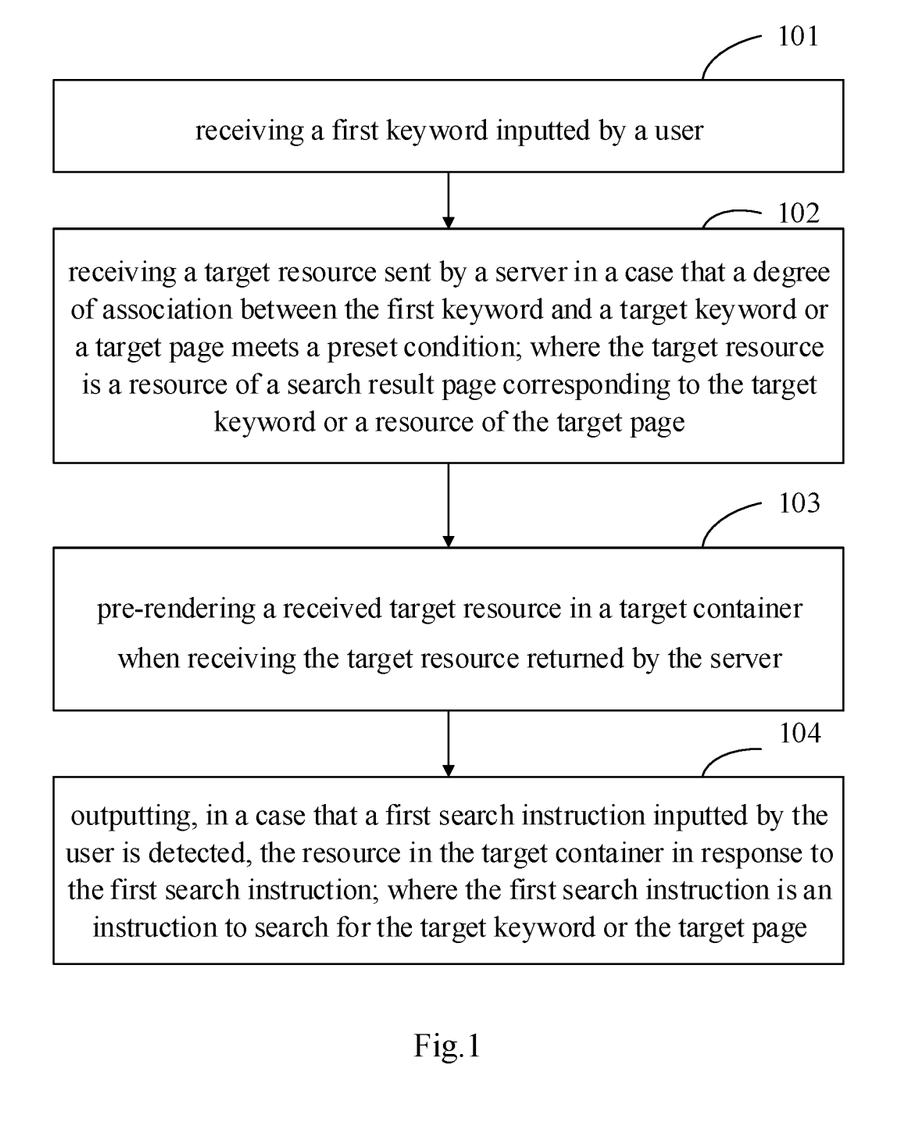
FIG. 1 is a schematic flowchart of a search method according to a first embodiment of the present application.

As shown in FIG. 1, an embodiment of the present application provides a search method, and the method includes the following step 101 to step 104.

Step 101: receiving a first keyword inputted by a user.

The "keyword" involved in the present application, such as the above-mentioned first keyword, a target keyword and a second keyword hereinafter, etc., may all be understood as a content inputted by the user in a search box during a search process. When the user inputs a search instruction, the keyword in the current search box become a search term, a query term or a query. Here, a search process may be understood as an entire process from when the user inputs a keyword in the search box, to when the user inputs a search instruction and a search result page is displayed.

The search method in the embodiment of the present application may be implemented by a client having a search function, such as a mobile phone, a tablet, a personal computer (PC).

Generally, in a search process, a process for the user to input a keyword is a dynamic process, and processes for different users to input keywords vary from person to person. In a search process, the user may enter keywords multiple times, that is, the user inputs a search instruction after entering keywords multiple times; or the user inputs the keyword once, that is, the user inputs a search instruction after entering the keyword once. For example, if a user want to search for "Bai Li's homesickness poems", the user may input into a search box "Bai Li's", "homesickness" and "poems" sequentially, or "Bai Li", "'s", "homesickness" and "poems" sequentially, or "Bai Li's homesickness poems", etc.

The first keyword inputted by the user may be any keyword inputted by the user, or may be a keyword input initially by the user, namely, the keyword input for the first time, or may also be the first keyword with a clear meaning inputted by the user, or may also be a keyword with other meanings, which is not described in detail.

In the embodiment of the present application, a way for the user to input keywords may be voice input or text input.

Step 102: receiving a target resource sent by a server in a case that a degree of association between the first keyword and a target keyword or a target page meets a preset condition; where the target resource is a resource of a search result page corresponding to the target keyword or a resource of the target page.

In the related art, after the user inputs a search instruction, for example, after the user clicks on a search button or an Enter key, a client initiates a search request to the server. Different from the related art, in the embodiment of the application, when the user inputs a keyword, the client may send a search request to the server in real time.

In the embodiment of the application, when the user is inputting a keyword, the client or server may predict in real time and dynamically whether there is a target keyword or a target page whose degree of association with the first keyword meets the preset condition. That the degree of association between the target keyword or the target page and the first keyword meets the preset condition may be understood as that the user is more likely to search for the target keyword or the target page when the user inputs the first keyword. In view of this, if the client may acquire corresponding resources from the server in advance, instead of requesting the corresponding resources from the server when the user actually searches for the target keyword or the target page, a search response speed may be greatly improved.

Therefore, after the user inputs the first keyword, if it is predicted that there is a target keyword whose degree of association with the first keyword meets the preset condition, the client may receive a resource (that is, the target resource) of a search result page corresponding to the target keyword sent by the server. If it is predicted that there is a target page whose degree of association with the first keyword meets the preset condition, the client may receive a resource (that is, the target resource) of the target page sent by the server.

For example, after a user inputs "Bai Li's", the client or the server may predict that "Bai Li's poems", "Bai Li's poems about the moon", "Bai Li's homesickness poems", and the like are target keywords whose degrees of association meet the preset condition, and the server may send resources of search result pages corresponding to these target keywords to the client in advance. For another example, after a user inputs "Spring Festival Gala", the client or server may predict that pages of "sending blessings in Spring Festival Gala" and "grabbing red envelopes in Spring Festival Gala" are target pages whose degrees of association meet the preset condition, and then the server may send resources of these target pages to the client in advance.

For a case that there are multiple target keywords or target pages whose degrees of association meet the preset condition, the server may send resources of search result pages corresponding to some or all of the target keywords or resources of some or all of the target pages to the client, or may also send a resource of a search result page corresponding to one (such as the one with the highest degree of association) of the target keywords or a resource of one of the target pages to the client.

Step 103: pre-rendering a received target resource in a target container when receiving the target resource returned by the server.

In this step, when receiving the target resource returned by the server, the returned resource may be pre-rendered in the target container, and the pre-rendered resource is loaded in the target container. The target container may be a container pre-created by the client, which may be used for storing pre-rendered resources.

For a case that there are multiple target keywords or target pages whose degrees of association meet the preset condition, if the server sends resources of search result pages corresponding to the multiple target keywords or resources of the multiple target pages to the client, then the number of target containers may be plural, and each target container loads a resource of a search result page corresponding to one target keyword or a resource of one target page.

It may be seen that, through the above process, it is realized that the client acquires the resources of the search result pages corresponding to the target keywords or the resources of the target pages from the server in advance, and stores these resources locally through pre-rendering.

It should be noted that, the container involved in the embodiment of the present application may be understood as a pre-rendering container. The container involved in the embodiment of the present application may be a container used for loading a webpage, or a container used for loading a small program, or a container used for loading structured data.

Step 104: outputting, in a case that a first search instruction inputted by the user is detected, the resource in the target container in response to the first search instruction; where the first search instruction is an instruction to search for the target keyword or the target page.

In this step, when a search instruction (i.e., the first search instruction) inputted by the user for the target keyword is detected, since the resource of the search result page corresponding to the target keyword has been preloaded in the target container, the client only needs to output the resource in the target container. Or, when a search instruction (i.e., the first search instruction) inputted by the user for the target page is detected, since the resource of the target page has been preloaded in the target container, the client only needs to output the resource in the target container. It should be noted that, an opening instruction of the target page may also be understood as a search instruction. For example, if a portal or a link to the target page is configured in a certain page, it is deemed that the user inputs a search instruction for the target page when the user clicks on the portal or the link.

Here, a specific process of outputting the resource in the container may be as follows: when the search instruction inputted by the user is detected, the container is switched from background to foreground, and the pre-rendered resource in the container is formed into a page for displaying to the user.

Figure 2:
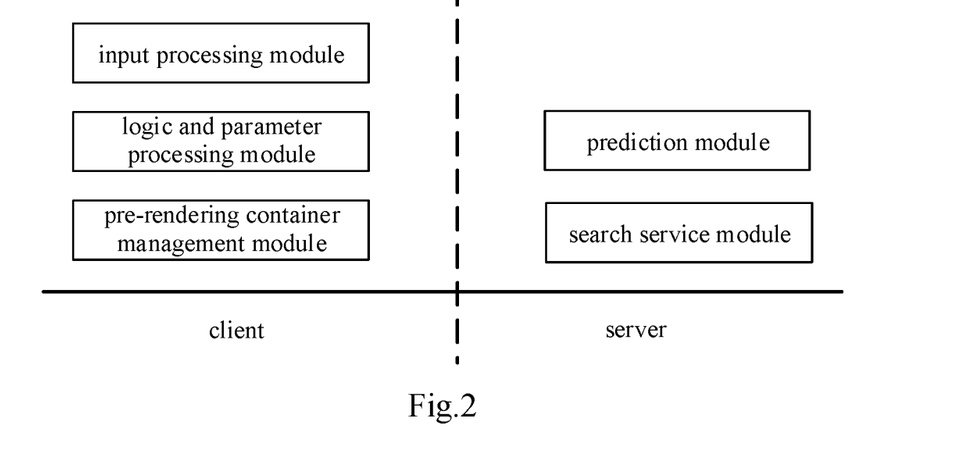
FIG. 2 is a structural schematic diagram of a client and a server according to the first embodiment of the present application.

In order to implement the above search process, as shown in FIG. 2, an input processing module, a logic and parameter processing module, and a pre-rendering container management module may be configured in the client, and a search service module and a prediction module may be configured in the server. The input processing module may be used to monitor a content inputted by the user and pass the content inputted by the user to the logic and parameter processing module; the pre-rendering container management module may be used to implement creation, release or reuse of a pre-rendering container; the logic and parameter processing module may be used to achieve: (1) assembling a search request parameter according to the keyword inputted by the user; (2) calling the pre-rendering container management module to load the resource of a corresponding search result page; (3) outputting the resource in the container corresponding to the current keyword when a search action is confirmed by the user. The prediction module may be used to predict, according to the keyword currently inputted by the user, a target page that may be opened later or a target keyword that the user may search; the search service module may be used to provide search-related service capabilities.

It should be noted that the prediction module may also be configured in the client.

In the embodiment of the present application, when the user is inputting a keyword, if a degree of association between the target keyword or the target page and the current keyword meets the preset condition, the client may receive the resource of the search result page corresponding to the target keyword or the resource of the target page sent by the server, and pre-render the resource returned by the server in the target container. In this way, when the user inputs a search instruction for the target keyword or the target page, the resource in the target container may be quickly output, so that the user may quickly acquire the search result page corresponding to the target keyword or the target page. Compared with the related art, a search response speed may be improved and the waiting time of the user is reduced in the present application.

Optionally, subsequent to the receiving the first keyword inputted by the user, the method further includes: sending a first search request for the first keyword to the server; pre-rendering a resource of a first search result page returned by the server in a first container when receiving the resource of the first search result page returned by the server; where the first search result page is a search result page corresponding to the first keyword.

In the present implementation, after receiving the first keyword inputted by the user, the client may send the first search request for the first keyword to the server. After receiving the first search request sent by the client, the server may return the resource of a corresponding search result page, that is, the resource of the first search result page, to the client. The client may receive the resource of the first search result page returned by the server. When receiving the resource of the first search result page returned by the server, the returned resource may be pre-rendered in the first container, and the pre-rendered resource is loaded in the first container. The first container may be a container pre-created by the client, which may be used for storing pre-rendered resources.

Through the above process, when the user is inputting the keyword, it is realized that the client acquires the resource of the search result page of the current keyword from the server in advance, and stores the resource of the search result page locally through pre-rendering. Therefore, when the user inputs the search request for the first keyword, the client may directly output the resource in the first container, which improves a search response speed and reduces the waiting time of the user.

Optionally, subsequent to the receiving the first keyword inputted by the user, the method further includes: sending, in a case that it is detected that the user has changed a current keyword to a second keyword, a second search request for the second keyword to the server; pre-rendering a resource of a second search result page returned by the server in a second container when receiving the resource of the second search result page returned by the server; where the second search result page is a search result page corresponding to the second keyword.

As mentioned above, in a search process, a process for the user to input a keyword is a dynamic process. Therefore, after the user inputs the first keyword, the keyword may be changed. There are various ways to change the keyword, such as adding a new content to the current keyword, modifying parts of the current keyword, or replacing the current keyword with new one.

For example, if the user inputs a keyword "Bai Li's", the current keyword is "Bai Li's", and if the user then inputs the keyword "homesickness", the user changes the current keyword "Bai Li's" to a second keyword "Bai Li's homesickness". For another example, if the user inputs a keyword "Bai Li's", the current keyword is "Bai Li's", and if the user changes the keyword "Bai Li's" to "Fu Du's", the second keyword is "Fu Du's". For still another example, if the user inputs a keyword "Ba Li", the current keyword is "Ba Li", and if the user changes the "Ba" in the keyword "Ba Li" to "Bai", the second keyword is "Bai Li".

In this step, no matter in which manner the keyword is inputted by the user, in one search process, every time a new keyword is inputted by the user, the client may send a new search request (i.e., the second search request) to the server in real time based on the current keyword (i.e., the second keyword). Taking a case in which the user inputs "Bai Li's", "homesickness" and "poems" sequentially as an example, when the user inputs "Bai Li's", the client sends a search request for "Bai Li's" to the server. When the user further inputs "homesickness", the client sends a search request for "Bai Li's homesickness" to the server. When the user further inputs "poems", the client sends a search request for "Bai Li's homesickness poems" to the server.

In this step, the client may receive a resource of a new search result page (i.e., the second search result page) returned by the server, and may pre-render the returned resource in the second container when receiving the resource of the second search result page returned by the server. The pre-rendered resource is loaded in the second container. The second container may be a container pre-created by the client, which may be used for storing pre-rendered resources.

It can be seen that, through the above process, the client may acquire, in advance, resources of different search result pages dynamically and in real-time from the server during a keyword input process, and store the resources of different search result pages in different containers locally through pre-rendering.

It is noted that, the second keyword is not limited to the keyword of an exact inputted by the user. The second keyword may be a keyword as a result of a second inputted by the user, or a keyword as a result of a third or further input. A keyword as a result of each change may be understood as the second keyword.

In order to illustrate the dynamic and real-time search manner involved in the keyword input process in a clearer manner, a description will be given below by taking a case in which the user inputs "Bai Li's", "homesickness" and "poems" sequentially into the search box as an example.

When the user inputs "Bai Li's" into the search box, the client initiates a search request for "Bai Li's" to the server. The server returns a resource of a search result page A1 to the client. The client receives the resource of the search result page A1 returned by the server, and pre-renders the resource of the search result page A1 in a container a1. A pre-rendered resource B1 is loaded in the container a1. The user further inputs "homesickness" into the search box, the client initiates the search request for "Bai Li's homesickness" to the server. The server returns a resource of a search result page A2 to the client. The client receives the resource of the search result page A2 returned by the server, and pre-renders the resource of the search result page A2 in a container a2. A pre-rendered resource B2 is loaded in the container a2. The user further inputs "poems" into the search box, the client initiates the search request for "Bai Li's homesickness poems" to the server. The server returns a resource of a search result page A3 to the client. The client receives the resource of the search result page A3 returned by the server, and pre-renders the resource of the search result page A3 in a container a3. A pre-rendered resource B3 is loaded in the container a3.

Through the above process, the client may acquire, in advance, the resources of the search result page corresponding to the current keyword dynamically and in real-time, and pre-render resources of search result pages in different containers, such that pre-rendered resources may be loaded in the different containers. Thus, the client may store locally the resources of the search result pages from the server in advance.

Optionally, the method further includes: outputting, in a case that a second search instruction inputted by the user is detected, a resource in a container corresponding to the current keyword in response to the second search instruction. The second search instruction is a search instruction for the current keyword, and the current keyword is not the target keyword, that is, a search target of the second search instruction is different from the search target of the first search instruction. The second search instruction is not a search instruction for the target keyword or the target page, but a search instruction for the current keyword.

In the implementation, when the second search instruction inputted by the user is detected, since the resource of the search result page corresponding to the current keyword has been preloaded in the corresponding container, the client only needs to output the resource in the container corresponding to the current keyword, so that the user may quickly acquire the search result page corresponding to the current keyword.

The following provides two implementation manners for predicting the target keyword or the target page.

Optionally, the receiving the target resource sent by the server in a case that the degree of association between the first keyword and the target keyword or the target page meets the preset condition includes: receiving, in a case that the target keyword or the target page whose degree of association with the first keyword meets the preset condition is predicted by the server, a target resource sent by the server based on the prediction after the server receives the first search request.

In the implementation, if the client initiates a search request for the first keyword (i.e., the first search request) to the server after receiving the first keyword inputted by the user, then after receiving the search request, the server may predict whether there is a target keyword or a target page whose degree of association with the first keyword meets the preset condition. When the server predicts the target keyword whose degree of association with the first keyword meets the preset condition, the server may send the resource of the search result page corresponding to the target keyword (i.e. the target resource) to the client; when the server predicts the target page whose degree of association with the first keyword meets the preset condition, the server may send the resource of the target page (i.e., the target resource) to the client.

After receiving the search request, the server may realize the process of returning the resources of the search result page (that is, the first search result page) corresponding to the first keyword, in addition to the foregoing process of prediction and the target resource sending after the prediction. These two processes may be implemented simultaneously or successively.

Since the server has a powerful big data computing capability and a powerful big data analysis capability, the prediction accuracy and efficiency may be improved by predicting the target keyword and the target page with the server, thus improvements in search response speed and search hit rate are facilitated.

Optionally, the receiving the target resource sent by the server in a case that the degree of association between the first keyword and the target keyword or the target page meets the preset condition includes: sending, in a case that the target keyword or the target page whose degree of association with the first keyword meets the preset condition is predicted by a client, a third search request for the target keyword or the target page to the server; receiving the target resource returned by the server based on the third search request.

In the implementation, after receiving the first keyword inputted by the user, the client may predict whether there is a target keyword or target page whose degree of association with the first keyword meets the preset condition. When the target keyword or the target page whose degree of association with the first keyword meets the preset condition is predicted by the client, the client may send the search request (i.e., the third search request) for the target keyword or the target page to the server.

After receiving the third search request sent by the client, the server may return the resource of the search result page corresponding to the target keyword (i.e., the target resource) to the client, or return the resource of the target page (i.e., the target resource) to the client, so that the client may acquire, in advance, the resource of the search result page corresponding to the target keyword or the resource of the target page, and pre-render these resources in the target container.

The above prediction process is implemented by the client, and does not need to rely on the search request for the current keyword sent by the client to the server, so there is no need to acquire the resource of the search result page corresponding to the current keyword in advance, which may save network overhead and network resources. For example, when a search possibility of the current keyword is low, and the target keyword or target page having a higher degree of association with the current keyword may be predicted based on the current keyword, there is no need to send a search request for the current keyword to the server.

Optionally, that the degree of association between the first keyword and the target keyword or the target page meets the preset condition includes any one of: in a case that a historical probability of searching for the target keyword after inputting the first keyword by the user is greater than or equal to a preset threshold, the degree of association between the first keyword and the target keyword meets the preset condition; in a case that there is a target page associated with the first keyword and valid at a preset time, the degree of association between the first keyword and the target page meets the preset condition.

In the implementation, a degree of association between keywords may be predicted based on user's historical input behavior. For example, if the user inputs "Bai Li", there is a 60% probability of searching for "Bai Li's poems". If the user inputs "Bai Li's homesickness", there is a 90% probability of searching for "Bai Li's homesickness poems". Assuming that the preset threshold is 50%, when "Bai Li" inputted by the user is received, "Bai Li's poems" may be used as the target keyword; when "Bai Li's homesickness" inputted by the user is received, "Bai Li's homesickness poems" may be used as the target keyword.

In the implementation, the target keyword is predicted based on the historical probability, thus the search response speed may be improved while the search hit rate is ensured.

In the implementation, it may also be predicted whether there is a target page associated with the first keyword and valid at a preset time. For example, there is an activity to watch the Spring Festival Gala to grab red envelopes on Chinese New Year's Eve, and a page of "Watching the Spring Festival Gala to grab red envelopes" is pre-configured and will be valid from 8 PM to 12 PM on Chinese New Year's Eve. Then, when keywords such as "Chinese New Year's Eve" and "Spring Festival Gala" inputted by the user are received, it may be predicted that the page of "Watching the Spring Festival Gala to grab red envelopes" is the target page. For another example, a limited-time registration page, a flash sale page or the like may be used as a target page.

In the implementation, by means of an association between the search targets, it is possible to acquire, in advance, the resource of the target page valid at the preset time according to the needs of the user. When the target page starts to be valid, there is no need to acquire the resource of the target page from the server, rather, the resource of the target page is acquired locally. In this way, it is possible to avoid the network paralysis caused by concentrated network resource requests initiated by many clients at the moment when the target page starts to be valid. Especially during certain thematic activities, a peak pressure on the server may be reduced and user experience is improved.

It should be noted that, for the target page associated with the first keyword and valid at the preset time, a prediction occasion may be any time before the preset time, for example, may be a time when the user inputs a related keyword, or a time after the user inputs a search instruction, or a time when the client opens a relevant page.

In order to better understand the above-mentioned implementations, the following examples are illustrated with reference to FIG. 3 to FIG. 4.

Figure 3:
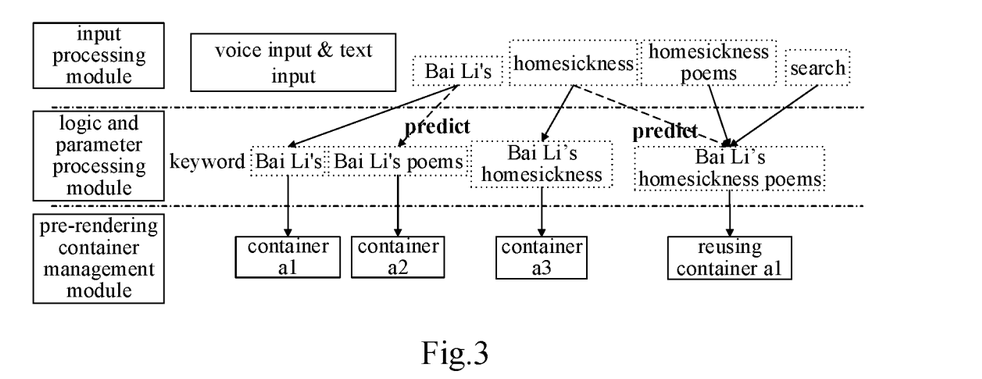
FIG. 3 and FIG. 4 are examples of the search method according to the first embodiment of the present application.

As shown in FIG. 3, the client receives "Bai Li's" inputted by the user and submits a search request for "Bai Li's" to the server. The server returns a resource of a search result page of "Bai Li's" to the client. The client pre-renders the resource of the search result page of "Bai Li's" returned by the server in a container a1. When the server receives the search request for "Bai Li's" and predicts that a degree of association between "Bai Li's poems" and "Bai Li's" is greater than the preset threshold, the server sends a resource of a search result page of "Bai Li's poems" to the client. The client pre-renders the resource of the search result page of "Bai Li's poems" returned by the server in a container a2. The client continues to receive "homesickness" inputted by the user, and the client further submits a search request for "Bai Li's homesickness" to the server. The server returns a resource of a search result page of "Bai Li's homesickness" to the client. The client pre-renders the resource of the search result page of "Bai Li's homesickness" returned by the server in a container a3. When the server receives the search request for "Bai Li's homesickness" and predicts that a degree of association between "Bai Li's homesickness poems" and "Bai Li's homesickness" is greater than the preset threshold, the server sends a resource of a search result page of "Bai Li's homesickness poems" to the client. The client reuses the container a1 to pre-render the resource of the search result page of "Bai Li's homesickness poems" returned by the server. The client continues to receive "homesickness poems" inputted by the user, and receives a search instruction inputted by the user, the client directly outputs the resource of the search result page of "Bai Li's homesickness poems" loaded in the container a1, in this way, it is realized that the search result page of "Bai Li's homesickness poems" is quickly displayed to the user.

Figure 4:
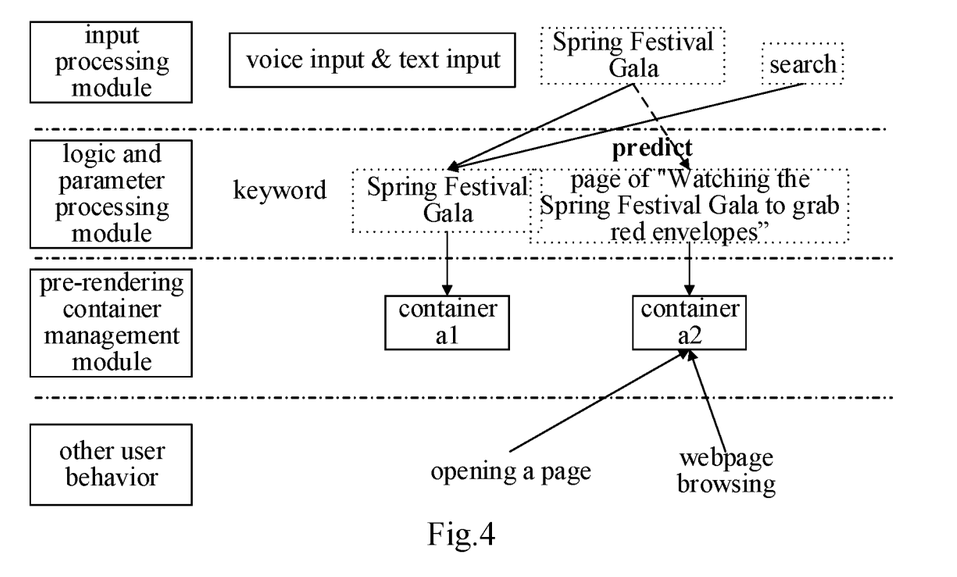

As shown in FIG. 4, the client receives "Spring Festival Gala" inputted by the user and submits a search request for "Spring Festival Gala" to the server. The server returns a resources of a search result page of "Spring Festival Gala" to the client. The client pre-renders the resource of the search result page of "Spring Festival Gala" returned by the server in a container a1. When the server receives the search request for "Spring Festival Gala" and predicts that a page of "Watching the Spring Festival Gala to grab red envelopes" is related to "Spring Festival Gala" and will be valid in 1 hour, the server will send a resource of the page of "Watching the Spring Festival Gala to grab red envelopes" to the client. The client pre-renders the resource of the page of "Watching the Spring Festival Gala to grab red envelopes" returned by the server in a container a2. When the client receives a search instruction inputted by the user, the client directly outputs the resource of the search result page of "Spring Festival Gala" loaded in the container a1, in this way, it is realized that the search result page of "Spring Festival Gala" is quickly displayed to the user. When the client receives a related instruction inputted by the user for opening the page of "Watching the Spring Festival Gala to grab red envelopes", the client may directly output the resource of the page of "Watching the Spring Festival Gala to grab red envelopes" loaded in the container a2, in this way, it is realized that the page of "Watching the Spring Festival Gala to grab red envelopes" is quickly displayed to the user.

Since the number of pre-created containers is usually limited, when all the pre-created containers are occupied, the containers may also be reused. That is, a certain container may be selected from the occupied containers for reusing. As the container is reused, resources previously loaded in the container may be destroyed or released. The reusing of the container may be implemented by using an algorithm such as a first-in-first-out algorithm or a least recently used algorithm. Assuming that a container a1, a container a2, and a container a3 are pre-created in the client, and the container a1 is occupied first, the container a2 is occupied subsequently, and the container a3 is occupied last, if a search request for a new keyword is generated currently, since all containers are occupied at this time, the container a1 may be reused for the search request for the current keyword.

As an exception, in the case that the target container is loaded with the resource of the target page valid at the preset time, when a container needs to be reused, the target container may not be reused, and other containers may be selected for reusing preferentially.

Optionally, the target container is loaded with a resource of the target page valid at the preset time.

The method further includes: prohibiting reusing or release of the target container in a case that all pre-created containers are occupied.

In the implementation, the reusing or release of the target container may be prohibited before the target page is valid, that is, before the aforementioned preset time. Or, the reusing or release of the target container may be prohibited before the entire valid duration of the target page expires. In this way, the target container may continue being a dedicated container for the target page, and the resource of the target page in the target container may be retained to the moment when the page starts to be valid, or even be retained during the entire valid duration, so that the user may quickly access the target page during the entire valid duration of the target page.

Optionally, the target container is loaded with a resource of the target page valid at the preset time.

The method further includes: storing the target resource in the target container onto a target disk; reloading the target resource from the target disk to the target container under a predetermined condition in a case that the target container is reused or released.

In the implementation, considering that the user may close or exit the current application program during or after the search, the target resource in the target container may be stored on the target disk during the process of pre-rendering the target resource in the target container, or after the target resource is pre-rendered in the target container. In this way, the target resource may be reloaded from the target disk to the target container under the predetermined condition even if the target container is reused or released, which ensures that users may quickly and effectively access the target page.

The predetermined condition may be, for example: an application program of the target page is restarted, or a preset time period before the preset time is reached (for example, 10 minutes before the preset time), or the like.

Furthermore, for the search results page or the target page, a size of a page resource is usually on the order of a megabyte (MB), and the number of resources is usually on the order of 100. In order to reduce network resource consumption and further reduce the time and resources spent on resource pre-rendering in the container, a multi-resource reusing strategy on the basis of the above search method may also be adopted in the process of returning the resource by the server in the embodiment of the present application.

For example, in the process of returning the resource of the second search result page by the server, if a first resource of the second search result page is the same as a second resource of the first search result page, the second resource in the first container may be reused in the second container. For another example, in the process of returning the resource of the first search result page by the server, if a third resource of the target search page is the same as a fourth resource of the first search result page, the fourth resource in the first container may be reused in the target container, or, the third resource in the target container may be reused in the first container.

In a word, if multiple containers involve the same resource, the client may reuse the same resource locally without sending a network request again. In this way, on one hand, the client does not need to send a network request for the same resource to the server multiple times, and the server does not need to return the same resource multiple times for the network requests for the same resource, thereby reducing the network resource consumption. On the other hand, the same resource does not need to be pre-rendered multiple times in different containers, thereby reducing the time and the resources spent on resource pre-rendering in the container. Therefore, by adopting the multi-resource reusing strategy, the search response speed may be further improved, meanwhile overall resource consumption is reduced in the embodiment of the present application. Thus, the search experience of the user may be further improved.

To implement the multi-resource reusing strategy, a network sharing management module may be further configured in the client. The network sharing management module can perform unified management and reusing of all resource requests in the search process. In the implementation, it may be determined whether different resources are the same according to request parameters, such as url, header and body, of the different resources.

The multi-resource reusing strategy may be applied to a resource that has been acquired from the server (i.e., reusing of resources), as well as a resource that is being acquired from the server but has not been acquired yet (i.e., reusing of resource request). For the resource that has been acquired from the server, the resource may be directly reused in multiple containers. For the reusing of resource requests, an association between the resource request and the container may be established, and after the resource request is completed, the associated container is notified, and the corresponding resource is reused in the container. Specifically, when the resource request is completed, relevant data, including control parameters such as a cache duration and an HTTP Header, may be cached, and the relevant data and corresponding control parameters returned by the server may be directly returned to the dependent container.

Both the reusing of the resource and the reusing of the resource request are achieved by adopting the multi-resource reusing strategy, thus the overall resource consumption is reduced to the maximum extent and the search response speed is improved to the maximum extent.

When the container is reused or released, if the container has an ongoing resource request, and the ongoing resource request is reused or may be reused by other containers, an association between the resource request and the container may be removed, so that the resource request is not destroyed or released with the reusing or releasing of the container. Therefore, the resource request originally generated in the container may continue to be reused by a container in need. In the implementation, the separate management of the resource request is achieved, which improves the reusability of the resource request, thus the overall resource consumption may be reduced to the maximum extent and the search response speed may be improved to the maximum extent.

In the embodiment of the present application, the reusing of the container and the reusing of the resource have different meanings. The reusing of the container is to reuse an occupied container, which represents the destruction and reusing of the container. The reusing of the resource is to load the same resource in different containers, which represent multiple uses of the resource.

It should be appreciated that, multiple optional embodiments of the search method of the present disclosure may be implemented in combination with each other or implemented separately, which is not limited in the present application.

The foregoing embodiments of the present application have at least the following advantages or beneficial effects.

In the present application, when the user is inputting a keyword, if a degree of association between the target keyword or the target page and the current keyword meets the preset condition, the client may receive the resource of the search result page corresponding to the target keyword or the resource of the target page sent by the server, and pre-render the above resource returned by the server in the target container. In this way, when the user inputs a search instruction for the target keyword or the target page, the resource in the target container may be quickly output, so that the user may quickly acquire the search result page corresponding to the target keyword or the target page. Compared with the related art, a search response speed may be improved and the waiting time of the user is reduced in the present application.

Second Embodiment

Figure 5:
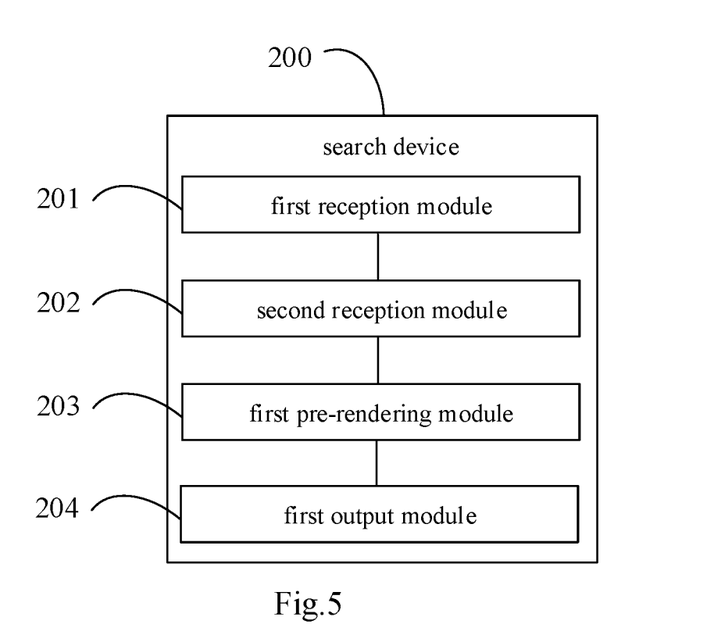
FIG. 5 is a structural schematic diagram of a search device according to a second embodiment of the present application.

As shown in FIG. 5, the present application provides a search device 200, and the device includes: a first reception module 201, configured to receive a first keyword inputted by a user; a second reception module 202, configured to receive a target resource sent by a server in a case that a degree of association between the first keyword and a target keyword or a target page meets a preset condition; where the target resource is a resource of a search result page corresponding to the target keyword or a resource of the target page; a first pre-rendering module 203, configured to pre-render a received target resource in a target container when receiving the target resource returned by the server; a first output module 204, configured to output, in a case that a first search instruction inputted by the user is detected, the resource in the target container in response to the first search instruction; where the first search instruction is an instruction to search for the target keyword or the target page.

Optionally, the search device 200 further includes: a first sending module, configured to send a first search request for the first keyword to the server; a second pre-rendering module, configured to pre-render a resource of a first search result page returned by the server in a first container when receiving the resource of the first search result page returned by the server; where the first search result page is a search result page corresponding to the first keyword.

Optionally, the search device 200 further includes: a second sending module, configured to send, in a case that it is detected that the user has changed a current keyword to a second keyword, a second search request for the second keyword to the server; a third pre-rendering module, configured to pre-render a resource of a second search result page returned by the server in a second container when receiving the resource of the second search result page returned by the server; where the second search result page is a search result page corresponding to the second keyword.

Optionally, the search device 200 further includes: a second output module, configured to output, in a case that a second search instruction inputted by the user is detected, a resource in a container corresponding to the current keyword in response to the second search instruction.

Optionally, the second reception module 202 includes: a first reception submodule, configured to receive, in a case that the target keyword or the target page whose degree of association with the first keyword meets the preset condition is predicted by the server, a target resource sent by the server based on the prediction after the server receives the first search request.

Optionally, the second reception module 202 includes: a sending submodule, configured to send, in a case that the target keyword or the target page whose degree of association with the first keyword meets the preset condition is predicted by a client, a third search request for the target keyword or the target page to the server; a second reception submodule, configured to receive the target resource returned by the server based on the third search request.

Optionally, that the degree of association between the first keyword and the target keyword or the target page meets the preset condition includes any one of: in a case that a historical probability of searching for the target keyword after inputting the first keyword by the user is greater than or equal to a preset threshold, the degree of association between the first keyword and the target keyword meets the preset condition; in a case that there is a target page associated with the first keyword and valid at a preset time, the degree of association between the first keyword and the target page meets the preset condition.

Optionally, the target container is loaded with a resource of the target page valid at the preset time; the search device 200 further includes: a prohibition module, configured to prohibit reusing or release of the target container in a case that all pre-created containers are occupied.

Optionally, the target container is loaded with a resource of the target page valid at the preset time; the search device 200 further includes: a storage module, configured to store the target resource in the target container onto a target disk; a loading module, configured to reload the target resource from the target disk to the target container under a predetermined condition in a case that the target container is reused or released.

Optionally, the predetermined condition includes at least one of: an application program of the target page is restarted; a preset time period before the preset time is reached.

Optionally, the container includes at least one of: a container used for loading a webpage; a container used for loading a small program; a container used for loading structured data.

The search device 200 according to the present application is capable of implementing various processes in the embodiment of the search method, and achieve the same beneficial effects. To avoid repetition, details are not described herein again.

According to embodiments of the present application, an electronic device and a readable storage medium are further provided.

Figure 6:
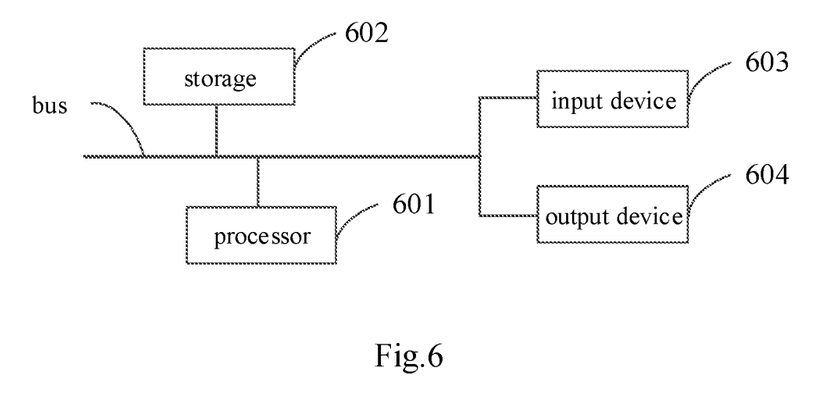
FIG. 6 is a block diagram of an electronic device for implementing a search method of an embodiment of the present application.

As shown in FIG. 6, a block diagram of an electronic device of a search method according to embodiments of the present application is illustrated. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present application described and/or claimed herein.

As shown in FIG. 6, the electronic device includes: one or more processors 601, a storage 602, and interfaces for connecting various components, including a high-speed interface and a low-speed interface. The various components are interconnected using different buses and may be mounted on a common motherboard or mounted in another manner as desired. The processors may process instructions configured to be executed in the electronic device, and the instructions include instructions stored in the storage or on the storage to display graphical information of GUI on an external input/output device (such as a display device coupled to the interface). In other embodiments, multiple processors and/or multiple buses may be used with multiple storages, if necessary. Also, multiple electronic devices may be connected, and each electronic device provides some of the necessary operations (e.g., in a server array, a group of blade servers, or a multi-processor system). FIG. 6 illustrates a single processor 601 as an example.

The storage 602 is a non-transitory computer-readable storage medium provided herein. The storage stores therein instructions executable by at least one processor to cause the at least one processor to implement the search method according to the present application. The non-transitory computer-readable storage medium of the present application stores therein computer instructions for causing a computer to implement the search method according to the present application.

The storage 602, as a non-transitory computer-readable storage medium, may be used to store non-transitory software programs, non-transitory computer-executable programs, and modules, such as program instructions/modules (e.g., the first reception module 201, the second reception module 202, the first pre-rendering module 203, and the first output module 203 shown in FIG. 5) corresponding to the search method in the embodiments of the present application. By running non-transitory software programs, instructions and modules stored in the storage 602, the processor 601 performs various functional applications and data processing of the search device, i.e., implements the search method in the method embodiment described above.

The storage 602 may include a program storage area and a data storage area, where the program storage area may store an operating system, and an application program required for at least one function; and the data storage area may store data created according to the usage of the electronic device for implementing the search method. In addition, the storage 602 may include a high speed random access memory, and may also include a non-transitory storage, such as at least one magnetic disk storage device, flash memory device, or other non-transitory solid state storage device. In some embodiments, the storage 602 may optionally include a storage remotely located with respect to the processor 601. These remote memories may be connected via a network to the electronic device for implementing the search method. Examples of the network mentioned above include, but are not limited to, the Internet, an intranet, a local area network, a mobile communication network, and a combination thereof.

The electronic device for implementing the search method may further include: an input device 603 and an output device 604. The processor 601, the storage 602, the input device 603, and the output device 604 may be connected to each other via a bus or in other ways. In FIG. 6, a connection by a bus is taken as an example.

The input device 603 may receive input numeric or character information and generate key signal inputs related to user settings and functional controls of the electronic device for implementing the search method. For example, the input device may include a touch screen, a keypad, a mouse, a trackpad, a touch pad, a pointing stick, one or more mouse buttons, a trackball, a joystick, etc. The output device 604 may include a display device, an auxiliary lighting device (e.g., LED), a tactile feedback device (e.g., a vibration motor), etc. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuitry, integrated circuit systems, application-specific integrated circuits (ASICs), computer hardware, firmware, software, and/or combinations thereof. These various embodiments may include implementation in one or more computer programs that may be executed and/or interpreted on a programmable system including at least one programmable processor. The programmable processor may be a dedicated or general purpose programmable processor, and may receive data and instructions from a storage system, at least one input device and at least one output device, and transmit data and instructions to the storage system, the at least one input device and the at least one output device.

These computing programs (also referred to as programs, software, software applications, or codes) include machine instructions for a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disc, storage, programmable logic device (PLD)) for providing machine instructions and/or data to a programmable processor, including a machine-readable medium that receives machine instructions implemented as machine-readable signals. The term "machine-readable signal" refers to any signal used to provide machine instructions and/or data to a programmable processor.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique described herein), or any combination of such back-end, middleware, or front-end components. The components of the system can be interconnected by any form or medium of digital data communication (e.g., a communication network). Examples of communication networks include a local area network (LAN), a wide area network (WAN), the Internet and a blockchain network.

The computer system can include a client and a server. The client and server are generally remote from each other and typically interact through a communication network. The relationship of client and server arises by virtue of computer programs running on respective computers and having a client-server relationship to each other.

According to the technical scheme of the embodiments of the present application, when the user is inputting a keyword, if a degree of association between the target keyword or the target page and the current keyword meets the preset condition, the client may receive the resource of the search result page corresponding to the target keyword or the resource of the target page sent by the server, and pre-render the above resource returned by the server in the target container. In this way, when the user inputs a search instruction based on the target keyword or the target page, the resource in the target container may be quickly output, so that the user may quickly acquire the search result page corresponding to the target keyword or the target page. Compared with the related art, a search response speed may be improved in the present application.

It is appreciated, all forms of processes shown above may be used, and steps thereof may be reordered, added or deleted. For example, as long as expected results of the technical solutions of the present application can be achieved, steps set forth in the present application may be performed in parallel, performed sequentially, or performed in a different order, and there is no limitation in this regard.

The foregoing specific implementations constitute no limitation on the scope of the present application. It is appreciated by those skilled in the art, various modifications, combinations, sub-combinations and replacements may be made according to design requirements and other factors. Any modifications, equivalent replacements and improvements made without deviating from the spirit and principle of the present application shall be deemed as falling within the scope of the present application.

What is claimed is:

1. A search method performed by an electronic device, comprising:
   receiving a first keyword inputted by a user;
   receiving a target resource sent by a server in a case that a degree of association between the first keyword and a target keyword or a target page meets a preset condition, wherein the target resource is a resource of a search result page corresponding to the target keyword or a resource of the target page, the degree of association between the first keyword and the target keyword or the target page meets the preset condition comprises: in a case that a historical probability of searching for the target keyword after inputting the first keyword by the user is greater than or equal to a preset threshold, the degree of association between the first keyword and the target keyword meets the preset condition;
   pre-rendering the received target resource in a target container when receiving the target resource returned by the server;
   wherein, when the target container is loaded with the resource of the target page valid at a preset time, and the method further comprises prohibiting reusing or release of the target container in a case that all pre-created containers are occupied;
   outputting, in a case that a first search instruction inputted by the user is detected, the resource in the target container in response to the first search instruction, wherein the first search instruction is an instruction to search for the target keyword or the target page;
   the method further comprises:
   storing the target resource in the target container onto a target disk;
   reloading the target resource from the target disk to the target container under a predetermined condition in a case that the target container is reused or released, wherein the predetermined condition comprises an application program of the target page is restarted.

2. The search method according to claim 1, wherein, subsequent to the receiving the first keyword inputted by the user, the method further comprises:
   sending a first search request for the first keyword to the server;
   pre-rendering a resource of a first search result page returned by the server in a first container when receiving the resource of the first search result page returned by the server, wherein the first search result page is a search result page corresponding to the first keyword.

3. The search method according to claim 2, wherein the receiving the target resource sent by the server in a case that the degree of association between the first keyword and the target keyword or the target page meets the preset condition comprises:
   receiving, in a case that the target keyword or the target page whose degree of association with the first keyword meets the preset condition is predicted by the server, the target resource sent by the server based on the prediction after the server receives the first search request.

4. The search method according to claim 1, wherein, subsequent to the receiving the first keyword inputted by the user, the method further comprises:
   sending, in a case that it is detected that the user has changed a current keyword to a second keyword, a second search request for the second keyword to the server;
   pre-rendering a resource of a second search result page returned by the server in a second container when receiving the resource of the second search result page returned by the server, wherein the second search result page is a search result page corresponding to the second keyword.

5. The search method according to claim 4, further comprising:
   outputting, in a case that a second search instruction inputted by the user is detected, a resource in a container corresponding to the current keyword in response to the second search instruction.

6. The search method according to claim 1, wherein the receiving the target resource sent by the server in a case that the degree of association between the first keyword and the target keyword or the target page meets the preset condition comprises:
   sending, in a case that the target keyword or the target page whose degree of association with the first keyword meets the preset condition is predicted by a client, a third search request for the target keyword or the target page to the server;
   receiving the target resource returned by the server based on the third search request.

7. The search method according to claim 1, wherein the container comprises at least one of:
   a container used for loading a webpage;
   a container used for loading a small program;

a container used for loading structured data.

8. An electronic device, comprising:
at least one processor; and
a storage communicatively connected to the at least one processor,
wherein the storage stores therein an instruction configured to be executed by the at least one processor, and the at least one processor is configured to execute the instruction, to implement a search method, the method comprises:
receiving a first keyword inputted by a user;
receiving a target resource sent by a server in a case that a degree of association between the first keyword and a target keyword or a target page meets a preset condition, wherein the target resource is a resource of a search result page corresponding to the target keyword or a resource of the target page, the degree of association between the first keyword and the target keyword or the target page meets the preset condition comprises: in a case that a historical probability of searching for the target keyword after inputting the first keyword by the user is greater than or equal to a preset threshold, the degree of association between the first keyword and the target keyword meets the preset condition;
pre-rendering the received target resource in a target container when receiving the target resource returned by the server;
wherein, when the target container is loaded with the resource of the target page valid at a preset time, and the method further comprises prohibiting reusing or release of the target container in a case that all pre-created containers are occupied;
outputting, in a case that a first search instruction inputted by the user is detected, the resource in the target container in response to the first search instruction, wherein the first search instruction is an instruction to search for the target keyword or the target page;
the method further comprises:
storing the target resource in the target container onto a target disk;
reloading the target resource from the target disk to the target container under a predetermined condition in a case that the target container is reused or released, wherein the predetermined condition comprises an application program of the target page is restarted.

9. The electronic device according to claim 8, wherein, subsequent to the receiving the first keyword inputted by the user, the method further comprises:
sending a first search request for the first keyword to the server;
pre-rendering a resource of a first search result page returned by the server in a first container when receiving the resource of the first search result page returned by the server, wherein the first search result page is a search result page corresponding to the first keyword.

10. The electronic device according to claim 9, wherein the receiving the target resource sent by the server in a case that the degree of association between the first keyword and the target keyword or the target page meets the preset condition comprises:
receiving, in a case that the target keyword or the target page whose degree of association with the first keyword meets the preset condition is predicted by the server, the target resource sent by the server based on the prediction after the server receives the first search request.

11. The electronic device according to claim 8, wherein, subsequent to the receiving the first keyword inputted by the user, the method further comprises:
sending, in a case that it is detected that the user has changed a current keyword to a second keyword, a second search request for the second keyword to the server;
pre-rendering a resource of a second search result page returned by the server in a second container when receiving the resource of the second search result page returned by the server, wherein the second search result page is a search result page corresponding to the second keyword.

12. The electronic device according to claim 11, further comprising:
outputting, in a case that a second search instruction inputted by the user is detected, a resource in a container corresponding to the current keyword in response to the second search instruction.

13. The electronic device according to claim 8, wherein the receiving the target resource sent by the server in a case that the degree of association between the first keyword and the target keyword or the target page meets the preset condition comprises:
sending, in a case that the target keyword or the target page whose degree of association with the first keyword meets the preset condition is predicted by a client, a third search request for the target keyword or the target page to the server;
receiving the target resource returned by the server based on the third search request.

14. A non-transitory computer readable storage medium storing therein a computer instruction, wherein the computer instruction is configured to be executed by a computer, to implement a search method, the method comprises:
receiving a first keyword inputted by a user;
receiving a target resource sent by a server in a case that a degree of association between the first keyword and a target keyword or a target page meets a preset condition, wherein the target resource is a resource of a search result page corresponding to the target keyword or a resource of the target page, the degree of association between the first keyword and the target keyword or the target page meets the preset condition comprises: in a case that a historical probability of searching for the target keyword after inputting the first keyword by the user is greater than or equal to a preset threshold, the degree of association between the first keyword and the target keyword meets the preset condition;
pre-rendering the received target resource in a target container when receiving the target resource returned by the server;
wherein, when the target container is loaded with the resource of the target page valid at a preset time, and the method further comprises prohibiting reusing or release of the target container in a case that all pre-created containers are occupied;
outputting, in a case that a first search instruction inputted by the user is detected, the resource in the target container in response to the first search instruction, wherein the first search instruction is an instruction to search for the target keyword or the target page;
the method further comprises:
storing the target resource in the target container onto a target disk;

reloading the target resource from the target disk to the target container under a predetermined condition in a case that the target container is reused or released, wherein the predetermined condition comprises an application program of the target page is restarted.

15. The non-transitory computer readable storage medium according to claim 14, wherein, subsequent to the receiving the first keyword inputted by the user, the method further comprises:
   sending a first search request for the first keyword to the server;
   pre-rendering a resource of a first search result page returned by the server in a first container when receiving the resource of the first search result page returned by the server, wherein the first search result page is a search result page corresponding to the first keyword.

16. The non-transitory computer readable storage medium according to claim 14, wherein, subsequent to the receiving the first keyword inputted by the user, the method further comprises:
   sending, in a case that it is detected that the user has changed a current keyword to a second keyword, a second search request for the second keyword to the server;
   pre-rendering a resource of a second search result page returned by the server in a second container when receiving the resource of the second search result page returned by the server, wherein the second search result page is a search result page corresponding to the second keyword.

17. The non-transitory computer readable storage medium according to claim 16, wherein, the computer instruction is configured to be executed by the computer, to further implement:
   outputting, in a case that a second search instruction inputted by the user is detected, a resource in a container corresponding to the current keyword in response to the second search instruction.

\* \* \* \* \*